INVENTORS
JOHN H. HYLER
WALTER E. LOTT
ERNST W. SPANNHAKE
BY John F. Schmidt
ATTORNEY INVENTORS
JOHN H. HYLER
WALTER E. LOTT
ERNST W. SPANNHAKE
BY John F. Schmidt
ATTORNEY Sept. 5, 1961 J. H. HYLER ET AL 2,998,998
LOAD RESPONSIVE TRACK TENSIONING DEVICE
Filed March 7, 1958 5 Sheets-Sheet 4

INVENTORS
JOHN H. HYLER
WALTER E. LOTT
ERNST W. SPANNHAKE
BY John F. Schmidt
ATTORNEY Sept. 5, 1961    J. H. HYLER ET AL    2,998,998
LOAD RESPONSIVE TRACK TENSIONING DEVICE
Filed March 7, 1958    5 Sheets-Sheet 5
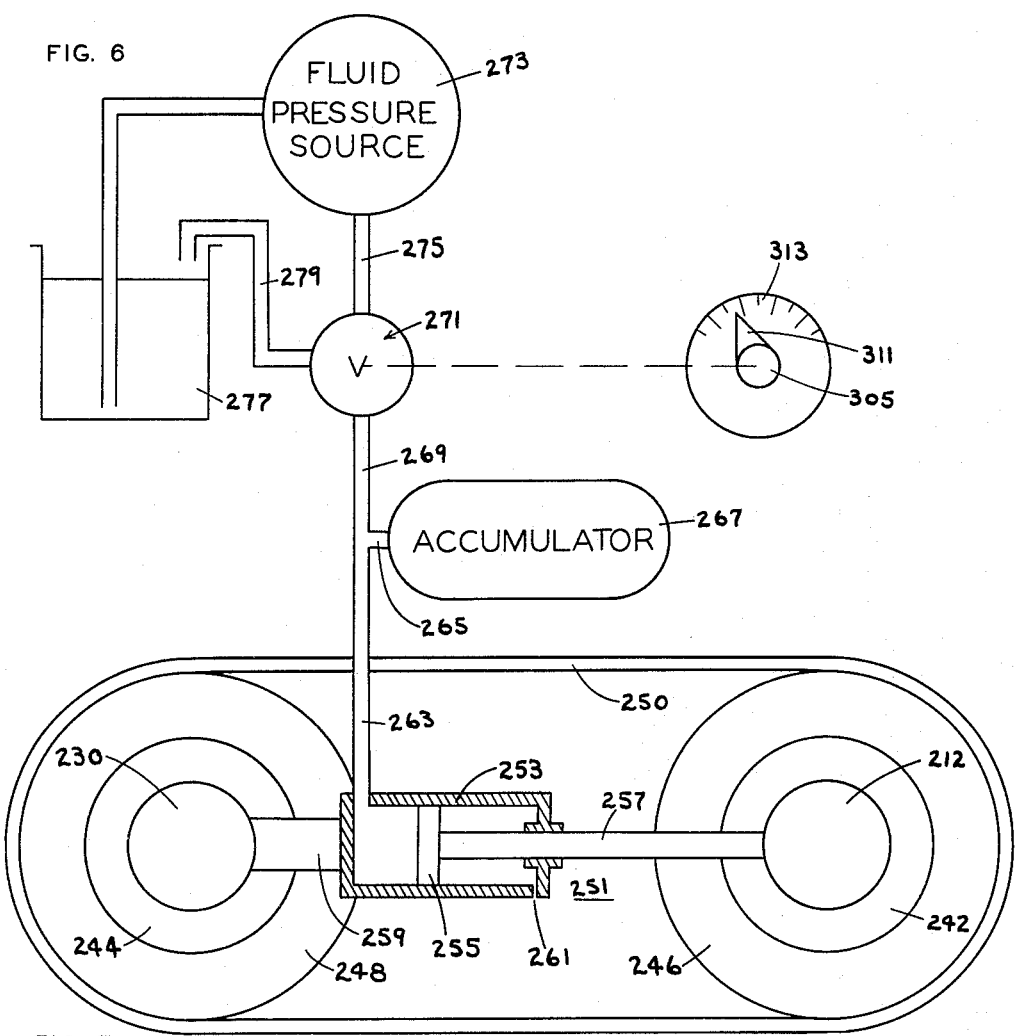
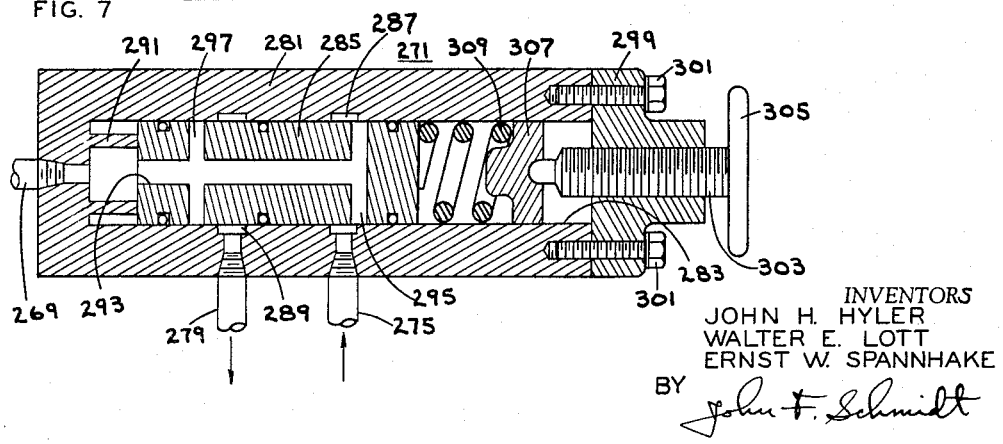
INVENTORS
JOHN H. HYLER
WALTER E. LOTT
ERNST W. SPANNHAKE
BY John F. Schmidt

United States Patent Office 2,998,998
Patented Sept. 5, 1961

2,998,998
LOAD RESPONSIVE TRACK TENSIONING DEVICE
John H. Hyler, Peoria, Walter E. Lott, Washington, and Ernst W. Spannhake, Peoria, Ill., assignors to LeTourneau-Westinghouse Company, Peoria, Ill., a corporation of Illinois
Filed Mar. 7, 1958, Ser. No. 719,838
14 Claims. (Cl. 305—31)

This invention relates to a land vehicle, and more especially, to a land vehicle of a type which is adapted to move on pneumatic tires or on a track mounted on the pneumatic tires, at the option of the operator. This application is a continuation-in-part of our application Ser. No. 531,800, filed August 31, 1955 (now abandoned), and assigned to the assignee of this invention.

There are many places in the construction and earthmoving industry which call for track-laying vehicles capable of negotiating all types of terrain. Such vehicles may have to pass through soft mud one minute and a dry, rock-strewn area in the next minute. Such a vehicle must be capable of producing sufficient traction under all of the varied circumstances, and it must moreover be capable of keeping its track or tracks on in spite of rocks, tree branches, or the like which may come between the tracks and the tires. If the track should happen to break because of the extremely rough usage, it is desirable that the operator be able to take the vehicle back to a repair point under its own power, or even to operate the vehicle under certain conditions without tracks.

It is accordingly an object of this invention to provide a land vehicle which under many operating conditions operates as a track-laying vehicle, the track of the vehicle being under very high tension, controlled by or regulated according to the weight of the vehicle, so that the track itself can carry the vehicle load even though the contact points under the wheels often do not touch the ground. It is another object of this invention to provide a vehicle which can operate track-laying or wheeled. Other objects will become apparent to those skilled in the art from a study of the following description and the accompanying drawings.

In the drawings:

FIG. 3 is on a much larger scale than FIG. 1;

FIG. 6 is a diagrammatic or schematic view illustrating still another embodiment; and FIG. 7 is a view in section showing details of a valve used in the embodiment of FIG. 6.

Figure 1:
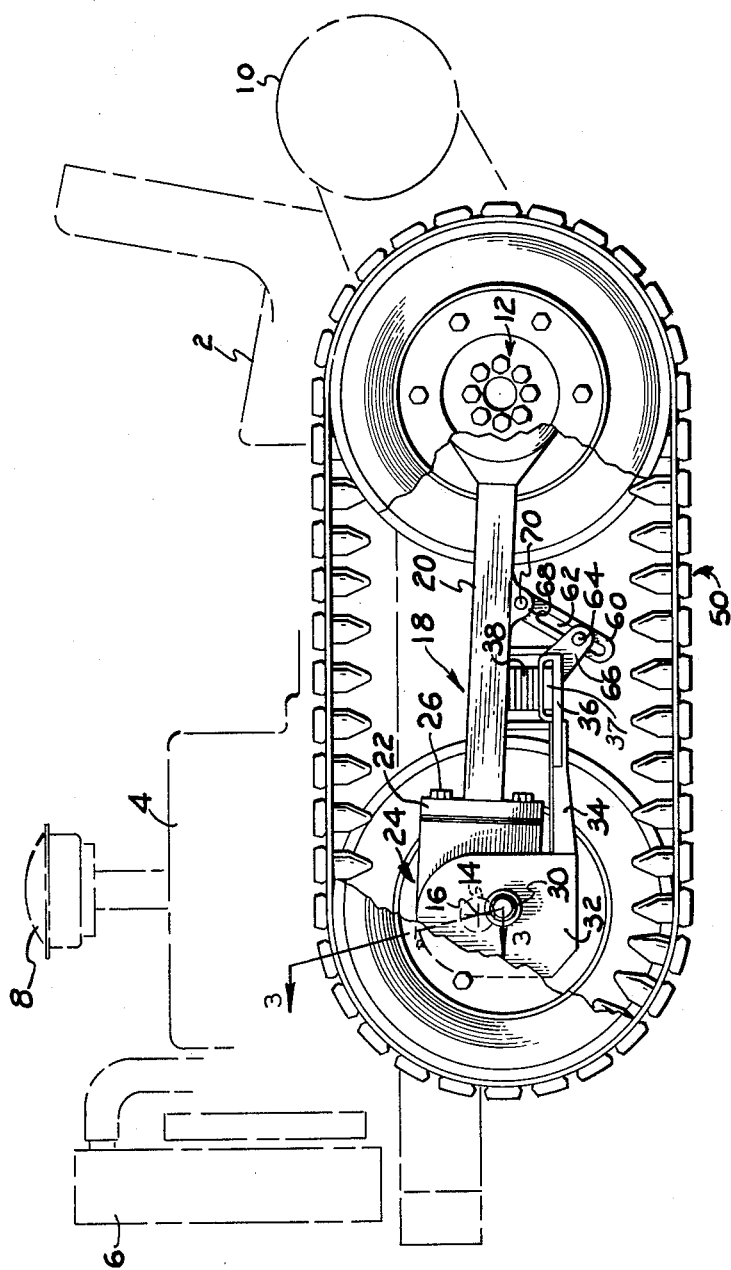
FIG. 1 is a side elevation view showing a vehicle embodying the invention, with parts broken away to show details.
Figure 5:
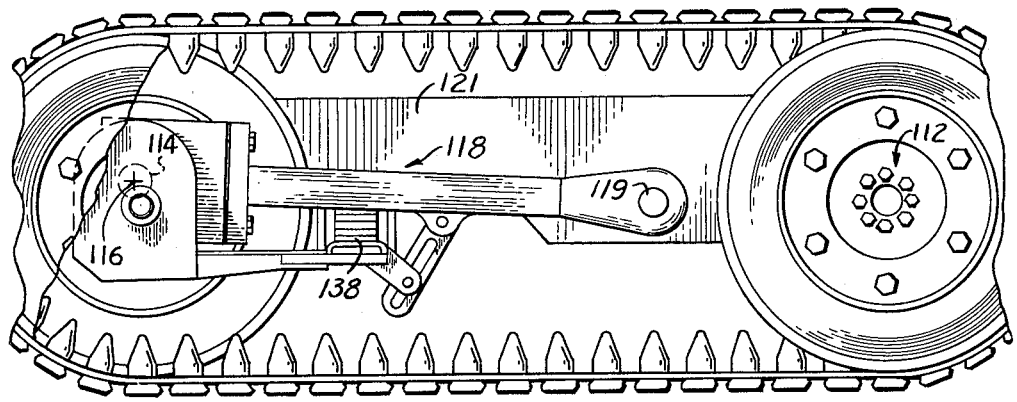
FIG. 5 is a view similar to FIG. 1 but showing an alternative embodiment of the invention.

Referring now in detail to the drawings, FIG. 1 shows a vehicle embodying the invention. As there shown, the many conventional features, such as the operator's seat 2, the engine 4, radiator 6, air cleaner 8, and a portion 10 of the power train are indicated in phantom because they do not per se constitute the invention and therefore need not be detailed. Furthermore, the vehicle is provided with any suitable conventional supporting structure. The supporting structure may be a frame such as is shown in FIG. 5 and in phantom in FIG. 1, or it may be the mechanism housing in an exoskeletal type of design such as is shown in Patent 2,655,089, issued October 13, 1953, to R. G. LeTourneau, or it may be a fabricated assembly such as has been popularized by the Nash automobile in its well-known "unitized" construction. Vehicles such as the one shown in LeTourneau Patent 2,655,089 (above) and the Nash (or Rambler) automobile referred to, do not have a frame as such, but have their functional equivalent. Frames and their equivalents are here referred to as the "supporting structure" of the vehicle.

Figure 2:
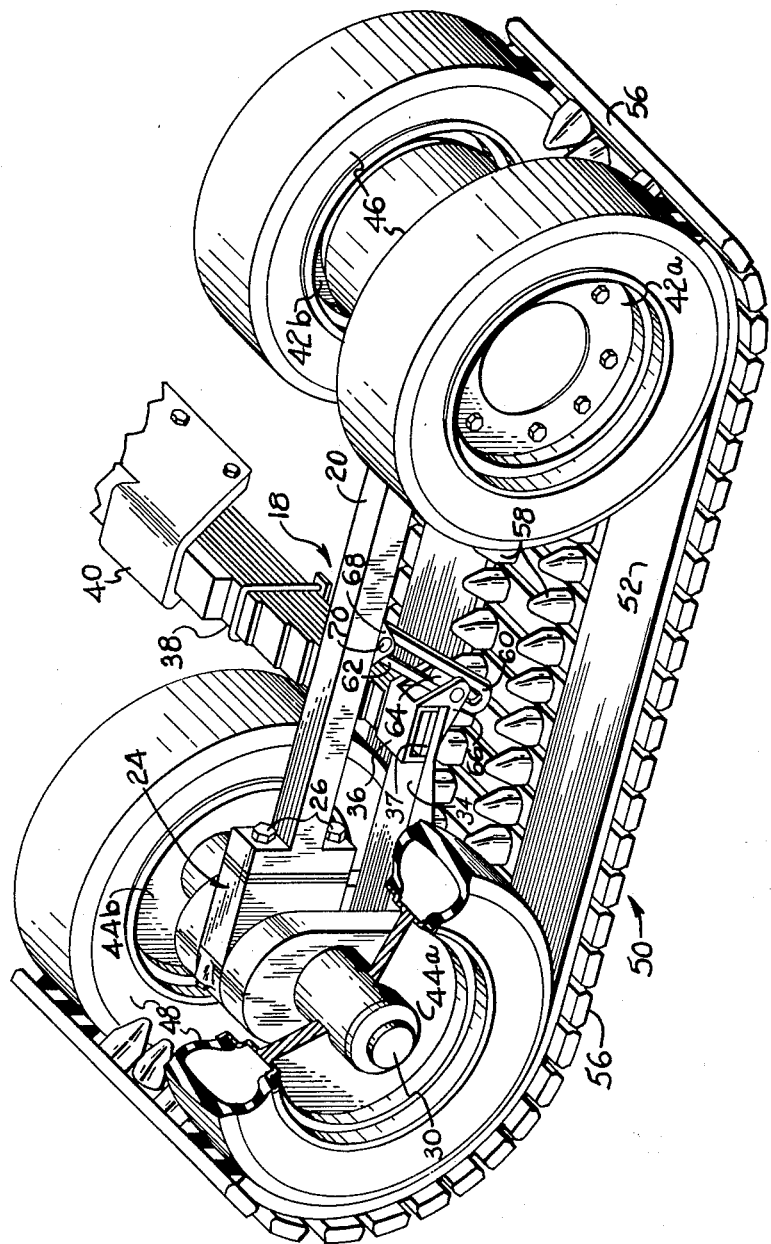
FIG. 2 is a view in perspective on a somewhat larger scale than FIG. 1, with parts broken away and in section.
Figure 3:
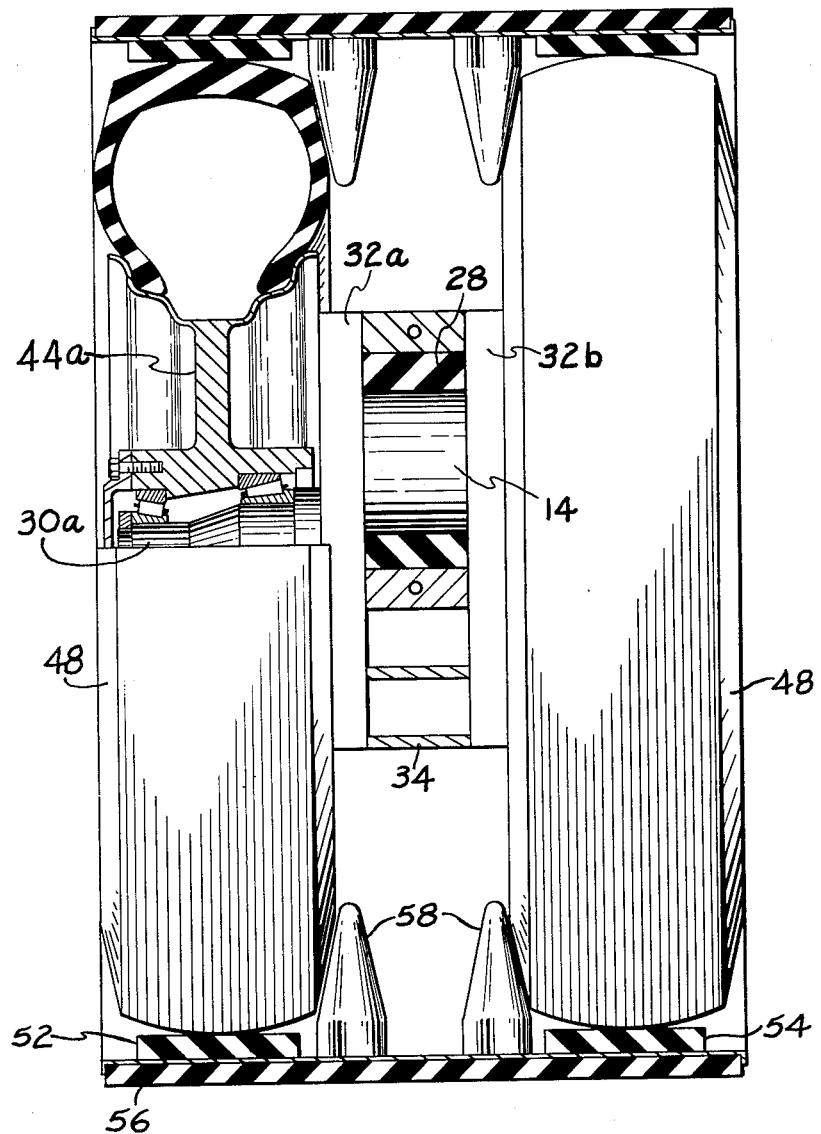
FIG. 3 is a view which is partly in section and partly in elevation, the portion in section being substantially on line 3—3 of FIG. 1.
Figure 4:
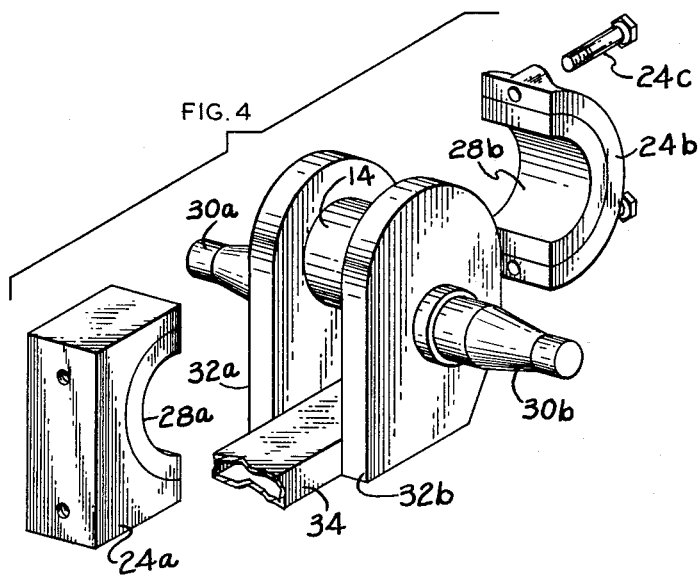
FIG. 4 is an exploded view on a larger scale showing the means which provide a pivot axis for the movable axle.

The vehicle is provided with one quite conventional axle indicated generally at 12 and which will be secured to the vehicle supporting structure in any conventional manner, with or without spring suspension as the designer may desire for the intended purpose of the vehicle. Means providing a pivot axis 16 are shown, the means including a preferably cylindrical member 14 as is best seen in FIGS. 3 and 4 as well as means indicated generally at 18 to limit movement of the pivot axis 16 relative to axle 12. The means 18 comprise an arm 20 which in the embodiment of FIGS. 1–4 is pivotally mounted on the housing of axle 12 and has a T or cross member 22 at the end opposite axle 12.

The means 18 to limit movement of the pivot axis 16 relative to axle 12 are torsionally elastic and resilient, by virtue of a block and cap assembly indicated generally at 24 secured to the T or cross member 22 by any suitable means, as for example by the capscrews 26, and a split rubber bushing 28; thus, the block and cap assembly 24 consists of a block 24a and a cap 24b held together by threaded members 24c, each of the pieces 24a and 24b carrying portions 28a and 28b of the split rubber bushing.

There is a second axle 30 mounted on the supporting structure by means of cylindrical member 14 and the means 18 described above. In the embodiment shown, the second axle is in two parts consisting of projections 30a and 30b, and these two parts are connected with the cylindrical member 14 by a rigid link 32, in two parts, 32a and 32b. The axle 30 is eccentric relative to the pivot axis 16. Thus, the two plates 32a and 32b together form means rigidly and eccentrically connecting the second axle 30 and the cylindrical member 14.

As will be well understood by those skilled in the art, the first-named axle 12 supports a portion of the vehicle weight in a conventional manner. Additional vehicle load support means are associated with the connecting means 32. Thus, an arm 34 is secured between the plates 32a and 32b and extends in a direction approximately parallel to the ground. The outer end of arm 34 is provided with a suitable seat or socket 36 to receive the projecting end 37 of a weight transfer beam 38. In the embodiment shown, the weight transfer beam 38 consists of a cantilever spring secured to the vehicle frame in any suitable manner by a spring clamp 40. Inasmuch as the assembly shown in FIG. 2 is duplicated for the other side of the vehicle, spring 38 may if desired be a semielliptical type of spring extending transversely of the vehicle and having an opposite end on the other side of the vehicle, not shown, which engages similar mechanism for said other side.

Wheels are provided on the two axles 12 and 30 discussed above. In a preferred embodiment of the invention as shown in the drawings, the wheels are provided in a dual arrangement. Thus, wheels 42a and 42b are provided on axle 12, and wheels 44a and 44b are provided on axle 30. It will of course be understood by those skilled in the art that another set of dual wheels, not shown, is provided at the other end of axle 12, and another set of dual wheels, also not shown, is provided on the other side of the vehicle corresponding to dual wheels 44a and 44b.

Pursuant to the objects of the invention, the wheels 42 and 44 are preferably equipped with pneumatic tires 46 and 48. This feature serves two purposes: it permits operation as a wheeled vehicle; and the pneumatic tires enter into the overall combination by permitting local deflection (of the tires) to accommodate rocks, sticks, etc., to make the use of a flexible track feasible in a combination such as is disclosed and claimed here.

A flexible endless track 50 tightly encompasses the wheels—in the embodiment shown, tightly encompasses pneumatic tires 46 and 48. Track 50 preferably comprises a pair of flexible bands 52, 54, spaced ground-engaging cleats or grousers 56 secured to both bands 52 and 54, and track guides 58 secured to grousers 56. In order effectively to accomplish one of the objects of the invention, track 50 must be very tight so as to give or yield very little even when the vehicle runs over something like a log or rock; toward this end, the tensioning force, or force biasing the axles apart and thus causing the tension in the tracks, is a multiple of that portion of the vehicle weight which affects track tension (in FIG. 1, with beam 38 being substantially at the center of gravity, this "portion" is substantially the "sprung" weight), the value of this multiple ranging from two to six, and an optimum value being around four. We have found, for example, that a body or sprung weight of 20,000 pounds should produce a force of 40,000 pounds on each side of the vehicle tending to push the front wheels away from the back wheels, making a total of 80,000 pounds.

In this connection, it may be noted that it is desirable that the track tension be as high as feasible for a number of reasons. A high track tension enhances the ability of the track to stay on regardless of side loads, occasioned by skidding or otherwise. Also, twisting stability of the track in its free length, regardless of asymmetrical load, is greater. Self-cleaning of the track at the area of tire-track contact is greater because mud squeezes out more readily. In addition, the load-carrying ability of the free portion of the track (between the wheels) is much greater in that the track can support the vehicle without excessive deflection even under the influence of point loads. And the ability of the track to maintain frictional contact with the driving tire under adverse friction conditions (slippery mud) is much greater.

The invention preferably provides stop means to limit the pivoting motion of axle 30 about the axis 16, especially such pivoting motion as tends to separate axles 30 and 12. Such stop means may be provided in the form of a link 60 slotted as shown at 62 to engage a stop pin 64 carried by suitable mounting ears 66 provided on socket 36; in the embodiment shown, link 60 is swingably carried on the underside of arm 20 by means of mounting ears 68 and a pin 70. In lieu of stop means like the link 60 shown, additional spring means may if desired be provided to replace the spring tension lost by the removal of track 50 when the vehicle must be operated without tracks, the additional spring means taking effect only after movement apart of axles 12 and 30 beyond a given distance.

Reference will now be had to FIG. 5 for a discussion of the embodiment there shown. In that embodiment, the means 118 to limit movement of the pivot axis 116 and member 114 are not mounted on axle 112 as in FIG. 1; instead, the fixed end of means 118 is pivotally mounted on a pivot pin 119 on suitable vehicle supporting structure, here shown as a longitudinal frame member 121. Thus, whereas the structure of FIGS. 1–4 discloses means 18 which hold member 14 a fixed distance from axle 12, the structure of FIG. 5 discloses means 118 which hold member 114 a fixed distance from a point (or line) on the supporting structure 121, the point (or line) being the axis of pivot 119. However, in both embodiments, means are provided connecting the basic vehicle supporting structure with the means which join or connect the pivot axis and the second axle, and this is done in such a way as to move the second axle relative to the first as the vehicle load changes. In the FIGS. 1–4 embodiment, this connecting means is axle 12, member 18, and beam 38; in FIG. 5, it is pin 119, member 118, and beam 138.

It is also to be noted that the line of centers of the pivot axis and the second axle axis (line 3—3 in FIG. 1) is more nearly vertical than horizontal, so the ratio of relative axle movement to movement of socket 36 is nearly constant. The optimum condition would be for line 3—3 to be vertical when the vehicle is carrying its contemplated load, so that any "bounce" of the vehicle will cause the line 3—3 to swing back and forth substantially equal amounts on both sides of the vertical.

In FIG. 6 we have shown schematically still another embodiment of the invention. In that figure, a side elevation view of only a portion of the vehicle is shown, namely the wheels and a simplified track. In this embodiment, wheels 242 and 244 are shown on axles 212 and 230 respectively, and equipped with pneumatic tires 246 and 248.

Axle 230 is mounted for limited movement relative to axle 212, and this mounting may be by any suitable means which need not be detailed here. A flexible band track 250 tightly engages the tires 246 and 248 and is kept tight by means which bias the axles apart in accordance with the vehicle load. As here shown, these means consist of a hydraulic jack 251 connected to the axles and kept under suitable pressure.

More specifically, jack 251 consists of a cylinder member 253 and a piston member 255 reciprocable therein and connected with a piston rod 257. Cylinder member 253 is connected by any suitable means 259 with axle 230, and piston rod 257 is suitably connected with axle 212. As shown, the jack 251 is of the single-acting type, being vented on the atmospheric pressure side of the piston as shown at 261. The other end of the cylinder is connected with one end of a conduit 263. Conduit 263 connects at its other end with a T 265 which in turn taps into the liquid chamber of an oleopenumatic pressure device of the general type shown in Reissue Patent 23,437 and here shown at 267. The other branch of the T connects with a conduit 269 which in turn is connected with a valve 271.

By means of a conduit 275, valve 271 is suplied with fluid under pressure from a suitable source 273 which includes a reservoir 277. A suitable conduit 279 is connected to return liquid from valve 271 to the reservoir.

Valve 271 is shown in detail in FIG. 7. As there shown, a body member 281 is provided with a substantially central bore 283 in which a valve spool 285 is slidably disposed.

The valve body 281 is provided with annular chambers communicating with the central bore and with conduits 275 and 279. As shown, an annular chamber 287 communicates with conduit 275 and a similar annular chamber 289 communicates with conduit 279. A suitable projection 291 is provided at one end of the bore for the accurate location of spool 285 at one limit of its travel.

Spool 285 is provided with a central bore 293 running from the extreme left end of the spool to a cross bore 295 which is spaced from the right end of the spool. Another cross bore 297 communicates with the central bore and is disposed between the left end of the spool and the bore 295. The spacing of the cross bores 295 and 297 is related to annular chambers 287 and 289 in such a way that, with the valve spool at the leftward limit of its travel, the ends of cross bore 295 are partially uncovered by annular chamber 287 and movement of spool 285 to the right gradually shuts off the communication of cross bore 295 with annular chamber 287. Cross bore 297, in the extreme leftward position of spool 285, is blocked by the surface of bore 283 in valve body 281. However, after valve spool 285 has moved to the right sufficiently to block the ends of cross bore 295, the ends of cross bore 297 are uncovered by the annular chamber 289. It will of course be appreciated by those skilled in the art that the ends of cross bore 295 will be closed before the ends of cross bore 297 are uncovered. Valve body 281 is provided at its right end with a closure 299 which may be secured to the valve body in any suitable manner as for example by the threaded means 301. The closure member 299 has a substantially central threaded opening adapted to receive a similarly threaded screw 303. At its outer end, screw 303 has secured to it a suitable hand wheel 305. The other end of screw 303 engages a spring seat 307. A spring 309 is compressed between spring seat 307 and the right end of valve spool 285.

As is best seen in FIG. 6, this form of the invention in its preferred embodiment is arranged to provide a pointer 311 on the hand wheel 305. Pointer 311 is attached to cooperate with a suitably calibrated scale 313. As will be understood by those skilled in the art, scale 313 will be mounted so as to be stationary relative to the valve body 281.

The scale 313 may be calibrated in any units desired. In a preferred form of the invention, the scale could be calibrated in terms of vehicle load.

Operation

The portion of the vehicle load which is carried by beam or spring 38 is transferred to arm 34 and tends to pivot axle 30 about the pivot axis 16 and in a direction away from axle 12. The vehicle weight thus transferred is transmitted through spring means when the transverse member 38 is a spring. The force transmitted to the end of arm 34 is resisted by the twisting of rubber bushing 28 which tightly engages member 14, and by the track 50. Thus bushing 28 is torsionally deformed between the internal cylindrical surface of assembly 24 and the external cylindrical surface of member 14, because member 14 is rotated or oscillated relative to assembly 24 by arm 34. Track 50 is under a very high tension, such that if the vehicle runs over a log or other projection engaged by the track midway between wheels 42 and 44, notwithstanding any appreciable deflection of track 50 that may occur, the track itself supports the weight of the vehicle without those portions of the track under the wheels being in contact with the ground.

Notwithstanding the high tension in the track, the combination of track and tires is nevertheless sufficiently yielding to permit foreign objects such as sizable branches, rocks, and the like, to find their way between the track and the pneumatic tires and to work their way around without throwing the track off the wheels. By way of example, a vehicle embodying the invention has been tested successfully with a conventional "two-by-four" engaged between the track and the pneumatic tires without throwing the track.

Moreover, the tension in the track is great enough to drive the track in every kind of terrain, even in mud, because the tension is such that mud which would be soft enough to make the track slippery is simply squeezed out, while mud of a heavier consistency at first packs under the tires but can then be stripped off by suitable baffles (not shown) and thrown to one side. For example, the vehicle referred to above has been operated with substantially one-half inch of mud packed between the tires and the track.

In addition, it is worth noting that the track tension is a function of vehicle weight, with the result that, to a considerable extent, the vehicle's own weight is used to determine the tension in the track. Accordingly, changes in weight of the vehicle automatically (in two of the embodiments) vary the track tension to provide the necessary traction relationship between tires and track and to maintain control of the track curvature between the tires.

If for some reason the track should break, the vehicle can be operated on its rubber tires, in which case the spring suspension for the portion of the load carried by axles 30 is provided by the rubber bushing 28, spring 38, and such additional spring suspension as may be provided to take the place of link 60 shown in the drawings.

The operation of the embodiment shown in FIG. 5 will be apparent to those skilled in the art from what is set forth above.

The operation of the embodiment of the invention shown in FIGS. 6 and 7 will now be summarized. The system will be charged with fluid under pressure in a manner which will be well understood by those skilled in the art and which need not be detailed here. If, in order to compensate for a heavier vehicle load, a higher track tension is desired, the operator turns the hand wheel 305 until the pointer indicates the load, or such other unit in terms of which the scale 313 is calibrated. Assuming that the threaded member 303 is provided with a right hand thread, turning the hand wheel 305 clockwise as seen from the right end of FIG. 7 will tighten up or increase the compression of spring 309. The increased pressure will force valve spool 285 leftward to register the ends of cross bore 295 with the annular chamber 287. Fluid under pressure will then be communicated from the fluid pressure source 273 to the accumulator 267 and the cylinder 253 by way of conduit 275, annular chamber 287, cross bore 295, central bore 293, conduit 269, T 265 and conduit 263. The increase in pressure will compress the air in accumulator 267 sufficiently to establish the higher pressure in the accumulator. The higher pressure is of course also felt in the cylinder 253 and serves to bias the axles 212 and 230 apart with a greater force than was present before hand wheel 305 was turned. Even though there may be no appreciable separation of axles 212 and 230, the force tending to push them apart will be increased and this will increase the tension on the band track 250. With the increasing tension, the band track will again be able to operate to secure the advantages set forth above in the discussion of the desirability of maintaining the track tension at a high level.

As the vehicle rolls over the terrain, the track is maintained under tension by a substantially constant force, by means of jack 251 and its connection with accumulator 267.

If now the load on the vehicle is lightened, and the operator desires to diminish track tension in order to reduce the wear on bearings, on the track itself, and the like, the operator turns the hand wheel 305 counter-clockwise by the indicated amount, thus reducing the compressive forces on spring 309. This unbalance in the system and the pressure in conduits 263 and 269 is sufficient to shift valve spool 285 to the right until cross bore 297 registers with annular chamber 289. Some liquid under pressure is thereupon bled out of the system through the valve by way of central bore 293, cross bore 297, and waste conduit 279, to the reservoir 277. Liquid bleeds out until the system is again substantially in balance, whereupon the mechanism is in a new stable of equilibrium in accordance with the new load. Once again the accumulator 267 serves to maintain the system under a substantially constant pressure which is somewhat lower than the pressure in the system before hand wheel 305 was turned counter-clockwise.

It will be clear from the foregoing that the illustrated invention provides a land vehicle of a track-laying type which may operate in all types of terrain and which may if necessary be operated trackless. Other advantages will be apparent to those skilled in the art.

While this application shows three forms which the invention may take in practice, it will be understood that these forms are shown for purposes of illustration and that the invention may be modified and embodied in various other forms without departing from its spirit or from the scope of the appended claims.

What is claimed is:

1. A land vehicle which may operate as a wheeled vehicle or as a track layer comprising a pair of axles, means to mount the axles so that the distance between the axes thereof is variable, load supporting means associated with the axle mounting means to increase said distance as the load is increased, wheels on the axles, and a flexible band track tightly engaging at least two wheels and opposing an increase in said distance.

2. In a track-laying vehicle having a supporting structure, an axle mounted on the supporting structure, a second axle means mounting the second axle on the supporting structure so as to make the second axle movable toward and away from the first axle, vehicle load support means associated with the mounting means to bias the two axles apart, wheels on the axles, and a flexible band track encompassing wheels on the two axles and biasing the axles toward each other.

3. In a land vehicle, a pair of axles, means to mount the axles so that the distance between the axes thereof is variable, the mounting means including a torsionally deformable resilient bushing opposing variation in said distance, load supporting means associated with the mounting means to vary the distance between axes as the load is increased, and wheels on the axles.

4. In a land vehicle having a supporting structure, an axle carried by the supporting structure, a second axle, means pivotally mounting the second axle on the supporting structure to permit movement of one axle away from and toward the other axle, vehicle load supporting means associated with the first-named means to bias the axles farther away from each other as the load increases, wheels on the axles, and a flexible band track encompassing the wheels and biasing the axles toward each other.

5. In a land vehicle having a supporting structure, an axle carried by the supporting structure, a second axle, means pivotally mounting the second axle on the supporting structure to permit movement of one axle away from and toward the other axle and including torsionally deformable resilient means opposing such movement, vehicle load supporting means associated with the mounting means to move the axles relative to each other as the load changes and thus to produce torsional deformation in the resilient means, and wheels on the axles.

6. In a land vehicle having a supporting structure, an axle mounted on the supporting structure, means carried by the supporting structure and providing a pivot axis, a second axle, means to mount the second axle on the first-named means with the axis of the second axle eccentric to the pivot axis, vehicle load support means associated with the second-named means and biasing the axle axes farther apart as vehicle load increases, wheels on the axles, and a flexible band track encompassing the wheels and biasing the axles toward each other in opposition to the bias of vehicle load.

7. In a land vehicle having a supporting structure, an axle mounted on the supporting structure, means carried by the supporting structure and providing a pivot axis, a second axle, means to mount the second axle on the first-named means with the axis of the second axle eccentric to the pivot axis and including torsionally deformable resilient means, vehicle load support means associated with the second-named means and effecting movement of the axles relative to each other as the load varies and thus deforming the resilient means, and wheels on the axles.

8. A track laying vehicle comprising wheels, at least one flexible band track tightly engaging at least two wheels, and wheel suspension means responsive to load variations to increase track tension as the vehicle load increases.

9. A vehicle as in claim 8, in which the suspension means includes means to bias the wheel axes apart as vehicle load increases.

10. A land vehicle which may operate as a wheeled vehicle or as a track layer comprising wheels, means to mount the wheels so that the distance between the axes thereof is variable and including resilient means opposing variations in the distance, at least one flexible band track tightly engaging at least two wheels, and vehicle load supporting means associated with the wheel mounting means to increase tension in the band by varying the distance between wheel axes.

11. A land vehicle comprising a supporting structure, an axle carried by the supporting structure, a second axle, axle mounting means for the second axle, means providing a pivot axis for the axle mounting means such that the line of centers between the pivot axis and the second axle axis is more nearly vertical than horizontal to permit movement of one axle away from and toward the other axle, said pivot-axis-providing means including torsionally deformable and resilient means opposing pivoting movement, vehicle load supporting means associated with said second axle mounting means to move the axles relative to each other as the load varies, such movement of the axles relative to each other being opposed by said resilient means, and wheels on the axles.

12. A track laying vehicle comprising wheels, at least one flexible band track tightly engaging at least two wheels, and means responsive to load variations to regulate track tension according to vehicle load.

13. A track laying vehicle comprising two pairs of substantially coplanar wheels, resilient tires on the wheels, means to mount the wheels so that the distance between coplanar wheels is variable, a flexible band track for the wheels and tightly engaging the tires thereof, vehicle load supporting means, and linkage associating the last-named means with the wheel mounting means to make track tension a continuous and direct function of vehicle load.

14. A track laying vehicle comprising two pairs of substantially coplanar wheels, resilient tires on the wheels, means to mount the wheels so that the distance between coplanar wheels is variable, a flexible band track for the wheels and tightly engaging the tires thereof, vehicle load supporting means, and linkage associating the last-named means with the wheel mounting means to make track tension a direct function of the vehicle load, the linkage being so proportioned that the ratio of tensioning force to vehicle load is a value between two and six.

References Cited in the file of this patent

UNITED STATES PATENTS

| | | |
|---|---|---|
| 1,482,726 | Best | Feb. 5, 1924 |
| 2,034,125 | Wickersham | Mar. 17, 1936 |
| 2,041,599 | Fergusson | May 19, 1936 |
| 2,426,342 | Couse | Aug. 26, 1947 |
| 2,427,162 | Schilling et al. | Sept. 9, 1947 |
| 2,719,062 | Arps | Sept. 27, 1955 |
| 2,774,638 | Spanjer | Dec. 18, 1956 |
| 2,837,379 | Selyem et al. | June 3, 1958 |

FOREIGN PATENTS

| | | |
|---|---|---|
| 40,225 | Denmark | May 21, 1929 |

UNITED STATES PATENT OFFICE
CERTIFICATE OF CORRECTION

Patent No. 2,998,998                      September 5, 1961

John H. Hyler et al.

It is hereby certified that error appears in the above numbered patent requiring correction and that the said Letters Patent should read as corrected below.

Column 4, line 45, for "suplpied" read -- supplied --; column 7, line 18, after "axle", first occurrence, insert a comma.

Signed and sealed this 1st day of May 1962.

(SEAL)
Attest:

ERNEST W. SWIDER                                DAVID L. LADD
Attesting Officer                                    Commissioner of Patents